(12) United States Patent
Saari (10) Patent No.: US 8,233,147 B2
(45) Date of Patent: Jul. 31, 2012

(54) SPECTROMETER AND A METHOD FOR CONTROLLING THE SPECTROMETER

(75) Inventor: Heikki Saari, Espoo (FI)

(73) Assignee: Valtion Teknillinen Tutkimuskeskus, Espoo (FI)

(*) Notice: Subject to any disclaimer, the term of this patent is extended or adjusted under 35 U.S.C. 154(b) by 408 days.

(21) Appl. No.: 12/524,335

(22) PCT Filed: Jan. 23, 2008

(86) PCT No.: PCT/FI2008/050023
§ 371 (c)(1),
(2), (4) Date: Jul. 23, 2009

(87) PCT Pub. No.: WO2008/090261
PCT Pub. Date: Jul. 31, 2008

(65) Prior Publication Data
US 2010/0097613 A1    Apr. 22, 2010

(30) Foreign Application Priority Data

Jan. 26, 2007  (GB) .................................. 0701536.5

(51) Int. Cl.
*G01J 3/28* (2006.01)
(52) U.S. Cl. ......................................................... 356/326
(58) Field of Classification Search .................. 356/326, 356/454
See application file for complete search history.

(56) References Cited

U.S. PATENT DOCUMENTS

| | | | |
|---|---|---|---|
| 4,839,614 A | 6/1989 | Hill et al. | |
| 5,026,992 A | 6/1991 | Wong | |
| 5,206,699 A * | 4/1993 | Stewart et al. | 356/301 |
| 5,208,651 A | 5/1993 | Buican | |
| 5,475,221 A | 12/1995 | Wang | |
| 5,784,157 A * | 7/1998 | Gorfinkel et al. | 356/318 |
| 5,886,247 A | 3/1999 | Rabbett | |
| 2004/0151440 A1* | 8/2004 | Flanders et al. | 385/88 |
| 2005/0010090 A1* | 1/2005 | Acosta et al. | 600/316 |
| 2005/0264808 A1 | 12/2005 | Wang | |
| 2006/0072112 A1 | 4/2006 | Flanders et al. | |
| 2006/0116562 A1 | 6/2006 | Acosta et al. | |

OTHER PUBLICATIONS

Search Report from U.K. Application No. GB0701536.5 dated May 30, 2007.

* cited by examiner

Primary Examiner — Kara E Geisel
(74) Attorney, Agent, or Firm — Birch, Stewart, Kolasch & Birch, LLP (57) ABSTRACT

The invention relates to a spectrometer for material analysis and to a control method for a spectrometer. The spectrometer includes a radiant source (140) formed by multiple single radiation sources (141) having different central wavelengths, for generating a measuring signal, a measurement object (100) containing a material to be analyzed, at least one electrically tunable Fabry-Perot filter (120, 220) for the band pass filtering the measuring signal by at least two pass bands, and a detector (300, 400) for detecting said filtered measuring signals received from the measurement object (100). The spectrometer has: means (312) for modulating each of the single radiation sources (141) and correspondingly means (307, 309) for demodulating the detected signals such that the signal from each single radiation source can be distinguished from each other in the detector (300, 400); and means for detecting (300, 400) and demodulating (306, 307) multiple pass hands simultaneously.

14 Claims, 8 Drawing Sheets

Mirror diameter 5 - 40 mm, thickness
= 1 - 5 mm, surface quality $\lambda/4 .. \lambda/10$

SPECTROMETER AND A METHOD FOR CONTROLLING THE SPECTROMETER

The present invention relates to a spectrometer for material analysis.

The invention also concerns a method for controlling a spectrometer.

In accordance with the prior art process spectrometers are using LED-light sources with multiple wavelength areas with various interferometer filters positioned in front of them. The detector comprises typically several individual detectors, which respectively have their own interferometers adapted for the target to be measured.

An alternative way for selecting the wavelength bands is to use a rotating filter disc in combination with one detector.

In US 2005/0264808 is described a system, where a tunable excitation source is used in combination with lock-in detection. This solution is complex and does not allow simultaneous detection of multiple wavelengths.

It is an object of the present invention to overcome disadvantages related to the above-described prior-art techniques and to achieve an entirely novel spectrometer and a control method for a spectrometer.

The invention is based on modulated light sources formed by multiple single light sources having different wavelengths in combination with a Fabry-Perot filter of multiple order such that signals from multiple orders are processed simultaneously and the detected signals are demodulated correspondingly.

More specifically, the spectrometer described herein comprises a radiant source, a measurement object, at least one electrically tunable Fabry-Perot filter, and a detector.

Furthermore, the method for a spectrometer for material analysis described herein comprises generating a measurement signal, directing the measurement signal to a measurement object containing a material to be analyzed, filtering the measurement signal by at least one electrically tunable Fabry-Perot filter, and detecting the filtered measuring signals received from the measurement object.

The invention offers significant benefits.

By a simple overall design simultaneous detection of multiple wavelengths can be achieved by a wideband detector. This is an advantage e.g., in concentration measurements using reference channel parallel with the measurement channel. Other applications for the invention are colour and concentration measurements in industrial applications. A third application area concerns reader devices for biological measurements, especially measurements based on fluorescence. In these fluorescence measurements both the light exiting the fluorescence and the actual fluorescent light can be measured simultaneously.

By selecting the wavelengths of the individual light sources such that they overlap with each other over the desired wavelength range, the desired range can be scanned by the Fabry-Perot element.

The invention is suitable for a wide spectral range from UV- up to IR-range. The invention suits both for absorption and reflection measurements. The detection can be made either with one detector or several detectors.

If the wavelengths of the individual light sources do not overlap, it is possible to adapt a pass band of the Fabry-Perot interferometer to each wavelength of the individual light sources.

When each of the light sources is modulated at an individual frequency, it is possible to detect simultaneously several pass bands of the Fabry-Perot interferometer.

The invention is next examined in greater detail with the help of exemplifying embodiments illustrated in the appended drawings, in which

FIG. 1b shows as a top view a Fabry-Perot interferometer sectioned between the mirrors in accordance with FIG. 1a.

The following terminology will be used in connection with the reference numerals:

100 Measurement Target or illumination fiber bundle
110 Imaging optics
120 NOSPI Fabry-Perot Interferometer platform
121 Optically transparent plates
122 FPI support structure
124 Piezo actuator
126 sensing electrodes for capacitive gap height measurement
128 Dielectric or metallic front surface minors
130 RGB color image sensor (detector), (CMOS or CCD)
140 Illumination LEDs covering the spectral range for the selected application
141 Single radiation source
142 Illumination LEDs
220 Second FPI
300 Measurement Detector
301 Lens
302 Measurement photodetector preamplifier
303 Lens
304 Reference detector
305 Reference photo detector preamplifier
306 Reference detector FFT or multi channel phase locked loop module
307 Measurement detector FFT or multi channel phase locked loop module
308 Data acquisition and processing unit Modulation of each Led is at different freq. And tuned currents Readout of FFT spectra or Phase locked loop signals at each led frequency Setting the gap width of FPI for predefined spectral bands
309 Closed loop control electronics for 3 piezo actuators
310 Piezo actuator DC/DC converter
311 Capacitive position sensor Preamplifiers
312 Multi led drive electronics
313 Beam splitter
400 Detector
401 connecting piece In accordance with FIG. 1a the Fabry-Perot interferometer in accordance with the invention is formed by two optically transparent plates 121 positioned parallel to each other. The surfaces of the plates 121 facing each other are coated by dielectric or metallic layers 128 forming mirrors. The length of the gap between the plates 121 is monitored by sensing electrodes 126. The length of the gap is made electrically adjustable by piezo actuators 124, which are positioned between one plate 121 and the Fabry-Perot support structure 122. Piezo stack actuators 124 are used in commercial nanostages and in some of them a capacitive position sensor is integrated into the actuator structure. There are available ring shaped actuators which can provide movement of 2-3 μm and stack actuators with a diameter of 3 mm and height of 2 to 20 mm which can provide 2-20 μm travel.

Figure 1A:
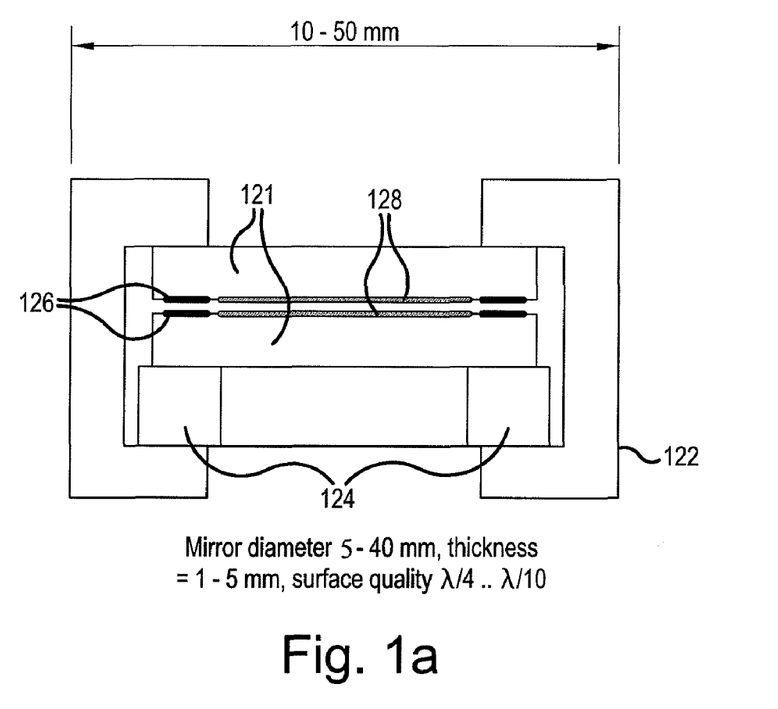
FIG. 1a shows as a sectioned side view a Fabry-Perot interferometer suitable for a spectrometer in accordance with the invention.
Figure 1B:
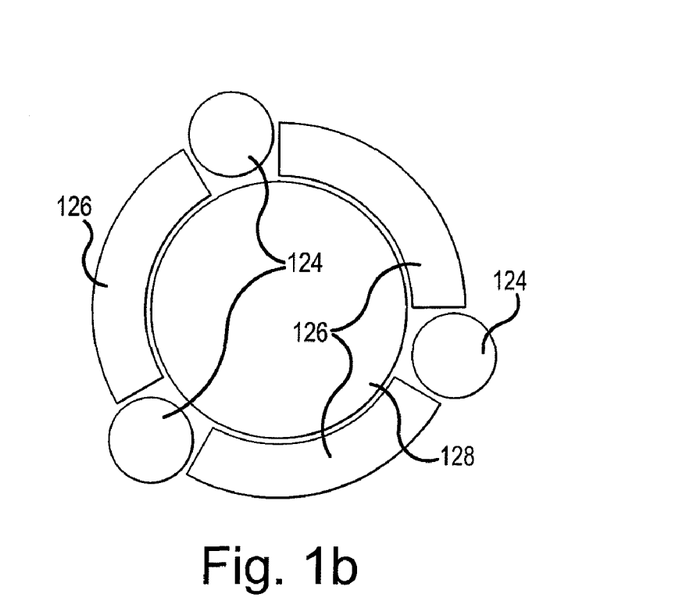

A possible concept of Fabry-Perot interferometer of FIGS. 1a and 1b is based on three piezo stack actuators 124 and the sensing electrodes 126 for the measurement of the position.

The other plate 121 (in figure the upper one) is fixedly attached to the Fabry-Perot support structure 122. The mirror diameter is typically 5-40 mm and total thickness about 1-5 mm. The length of the gap is typically in the range of 0.25-20 μm and adjustable at least partially in this range.

In accordance with FIG. 1b the measuring electrodes 126 surround the mirror 128 and the piezo actuators 124 are evenly distributed around the mirror 128.

Figure 2:
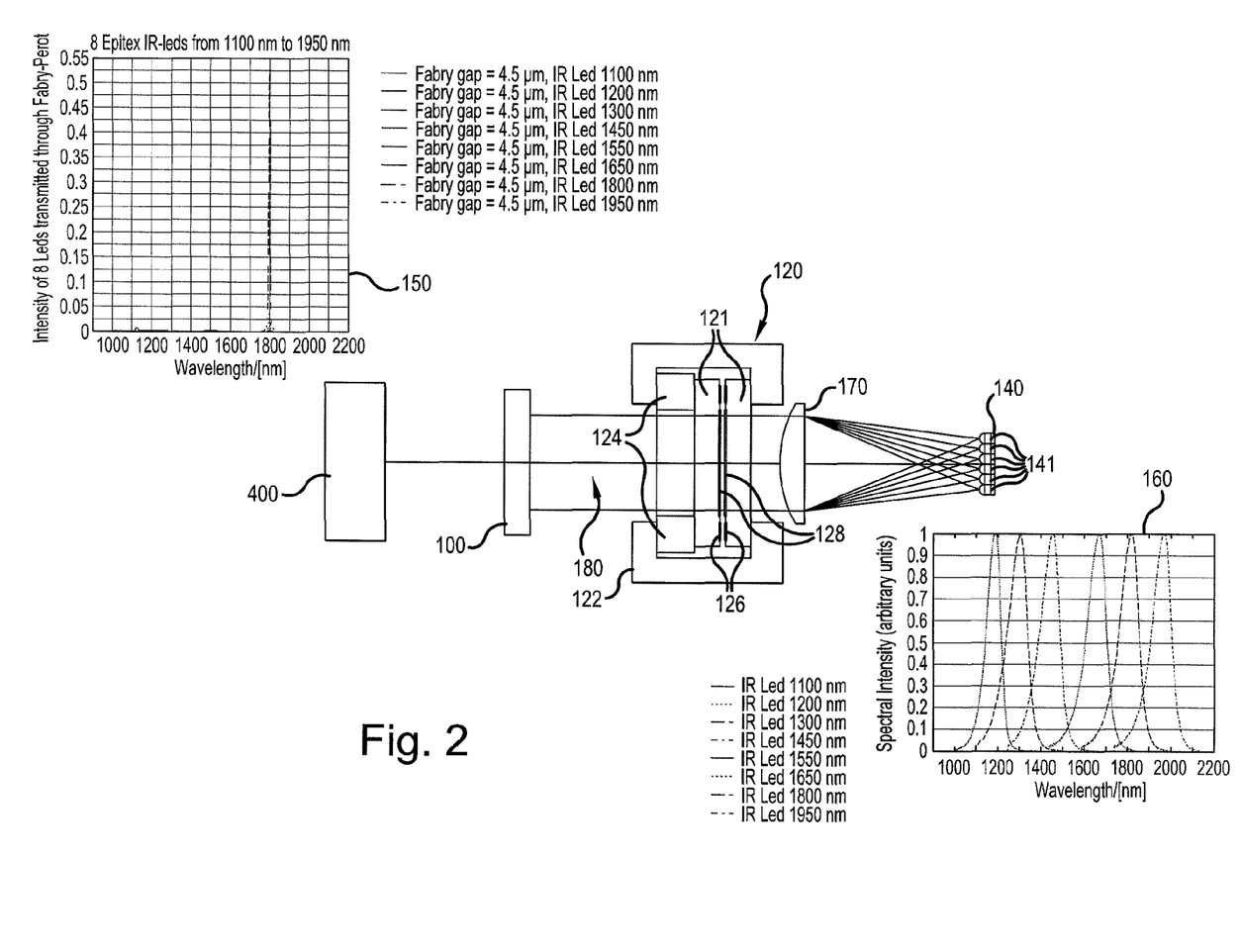
FIG. 2 shows as a block diagram a basic configuration a spectrometer in accordance with the invention.

In accordance with FIG. 2 the Fabry-Perot element 120 with cavity with changeable gap width provides the means for controlling the spectrum of the light source 140 including multiple individual light sources 141.

The higher the gap width the more orders there are in the FPI. For the selected gap width $d_{gap}$ and for the order n the center wavelength of the pass band is given by $$\lambda_n = \frac{2 \cdot d_{gap}}{n}$$

In accordance with FIG. 2 the light source 140 comprises multiple individual light sources 141 each having a wavelength differing from other individual light sources 141. The signal is directed to the optical path 180 through a focusing lens 170, Fabry-Perot interferometer 120, measurement target 100 and finally to the detector 400. Graph 160 represents a typical output spectrum or the light source 140 and graph 150 a corresponding spectrum from the output of the spectrometer 120.

As later described in detail a data acquisition and processing unit controls the modulation frequency and drive currents of each LED 141. By using different modulation frequency or time multiplexing for each LED their signals can be readout simultaneously. The intensities of LEDs can be controlled by changing their drive currents. The light from Leds is collimated by the lens 170 and directed through the FPI 120 to the target 100 or a fiber bundle if the target is not reachable directly.

In accordance with FIG. 3 one embodiment of the system in accordance with the invention functions as follows:

Each of the individual light sources 141 is modulated by a separate frequency or at the same frequency but at a separate phase such that these signals can be separated from each other in demodulators 306 and 307 after the detectors 300 and 304. In the optical measurement channel 180 is positioned a focusing lens 170 for aligning the light to the measurement path. In the solution of FIG. 3 there is a beam splitter 313 for guiding (reflecting) part of the measurement signal to the reference channel formed by focusing lens 303, reference detector 304 and preamplifier 305.

The reference photo detector 304 is used to monitor the output intensity of each Led 141. The light transmitted or reflected by the target 100 is focused by a lens 301 on the measurement photo detector 300. The preamplifiers 302 and 305 in the proximity of the measurement and reference detectors 300 and 304 amplify and scale the detector signals to the input signal range of the FFT module or of the multi channel phase locked loop amplifiers 307 and 306. The Data acquisition and processing unit 308 processes the signals of the measurement and reference detectors 300 and 304 and adds the knowledge of the selected wavelengths to the signals of each Led 141. The wavelength knowledge is based on the capacitive position sensor 126 output, which gives value of the gap width of the Fabry-Perot interferometer 120. The accuracy and stability of the wavelength scale is dependent on the quality of the capacitive position measurement.

The block 309 is a closed loop control element for controlling the piezo elements 124 and/or the Fabry-Perot element 120. For control purposes this element 309 receives signals from the capacitive gap height sensors 129 through preamplifiers 311 and based on this information controls the three piezo elements 124 via piezo actuator (DC/DC converter) 310 for changing the gap of the Fabry-Perot element.

Figure 3:
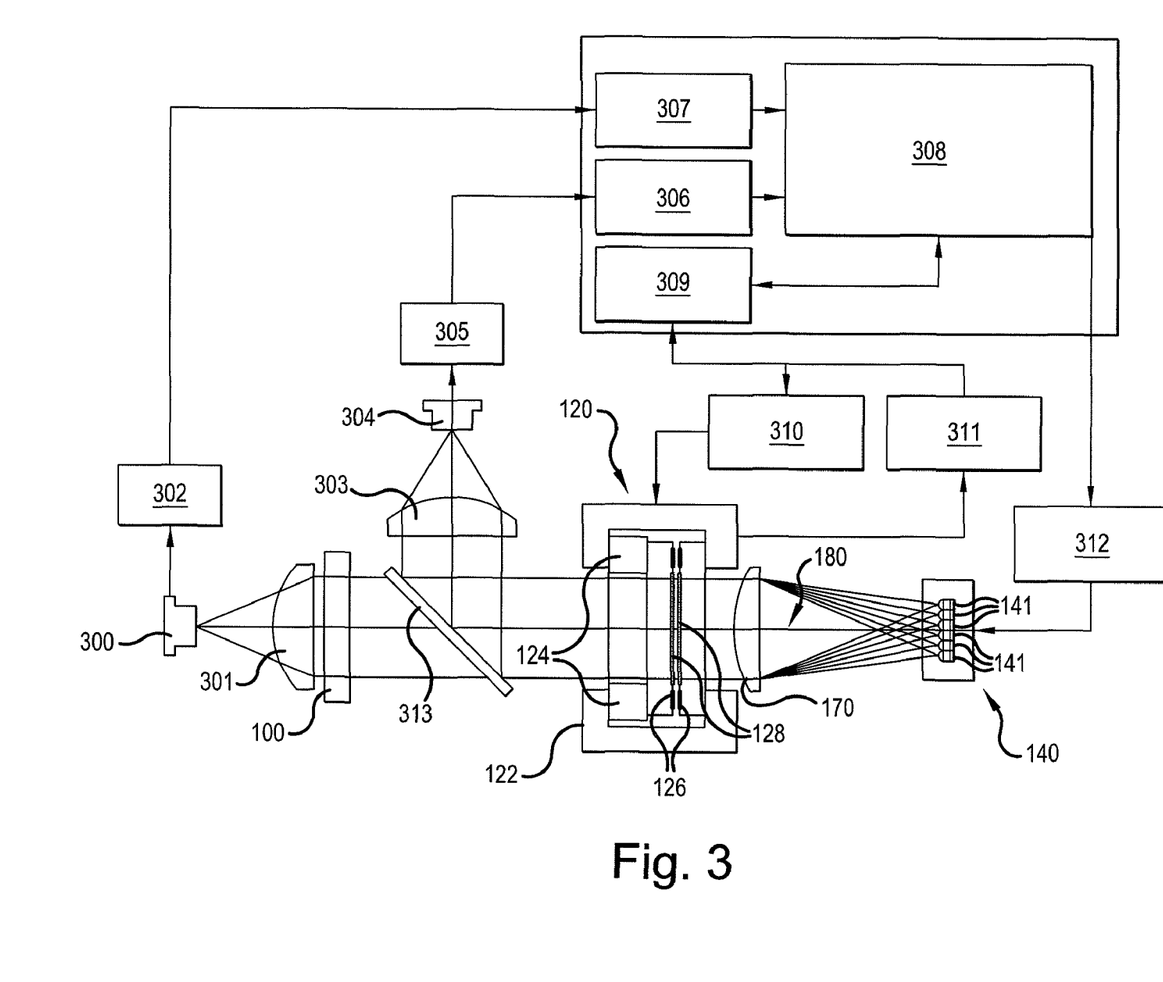
FIG. 3 shows as a block diagram a first modification of a spectrometer in accordance with the invention.
Figure 4:
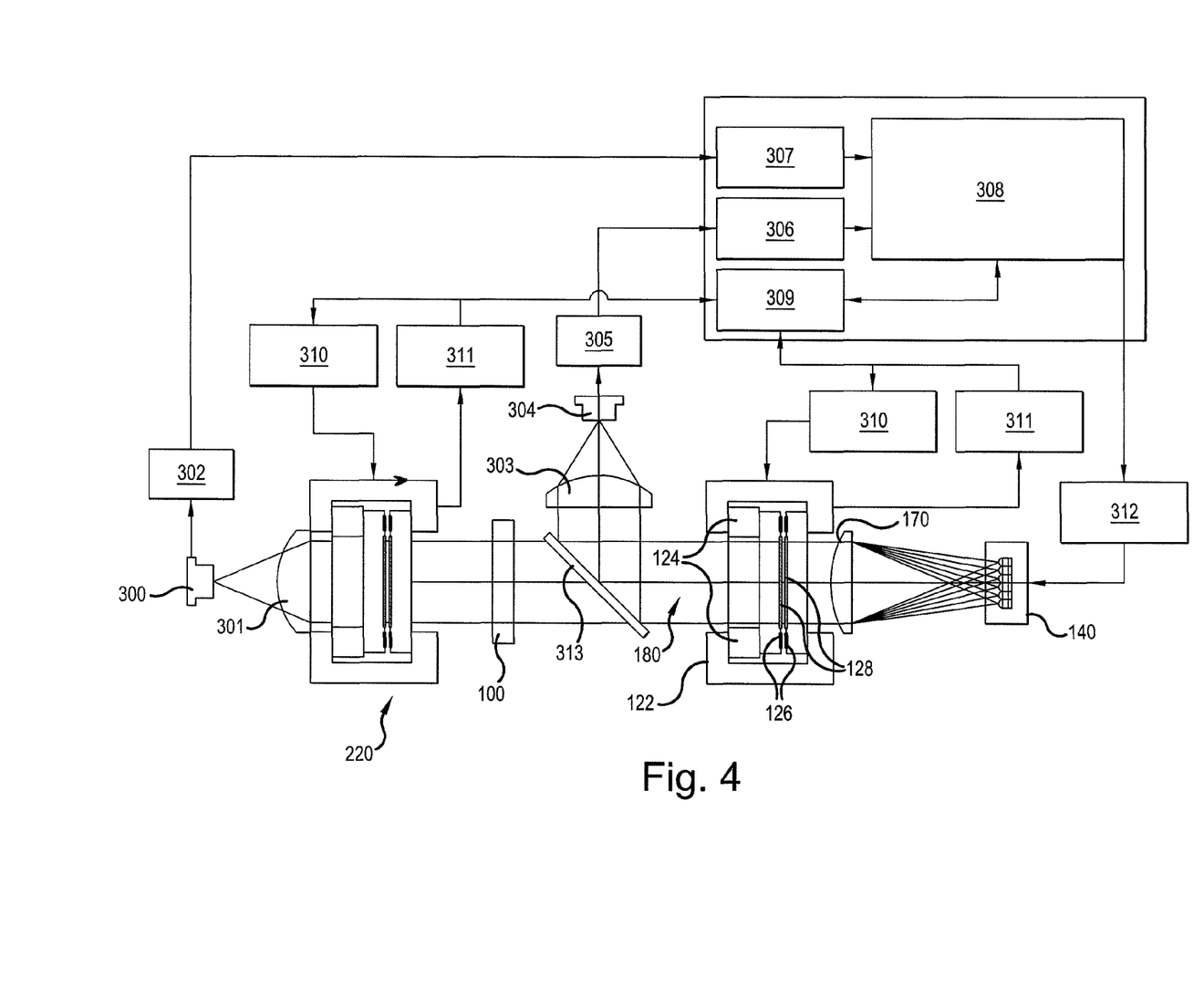
FIG. 4 shows as a block diagram a second modification of a spectrometer in accordance with the invention.

In accordance with FIG. 4 on the signal path 180 after the measurement target 100 and before the detector 300 is positioned a second, typically identical Fabry-Perot element 220 with similar control elements 310 and 311 as in FIG. 3. The benefit of using a second Fabry-Perot interferometer 220 in front the detector 300 is the suppression of light intensity outside the selected wavelength band.

Figure 5:
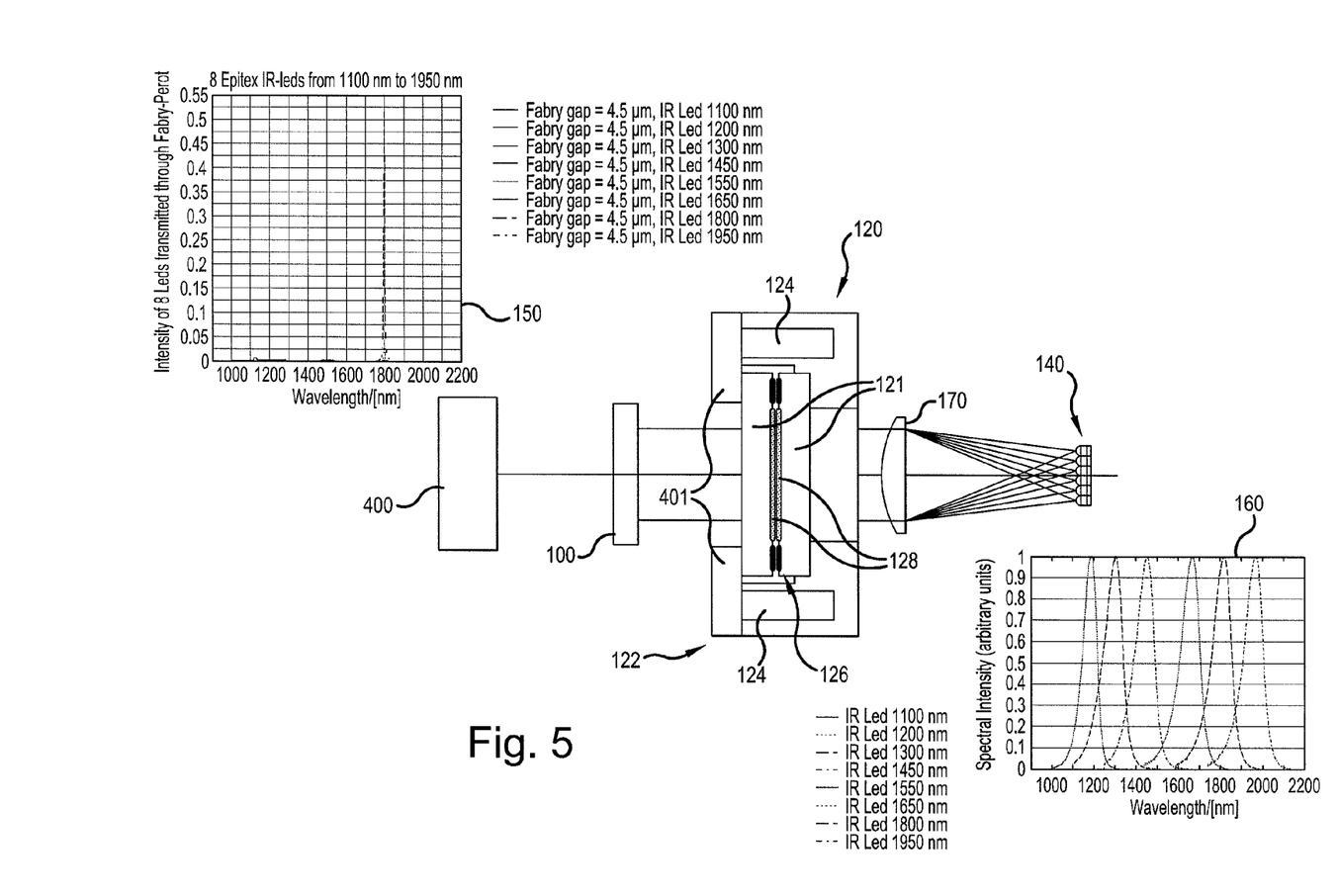
FIG. 5 shows as a block diagram a third modification of a spectrometer in accordance with the invention.

In accordance with FIG. 5 the solution of FIG. 2 is modified such that the piezo actuators 124 are connected to the optically transparent plate 121 via connecting pieces 401.

Figure 6:
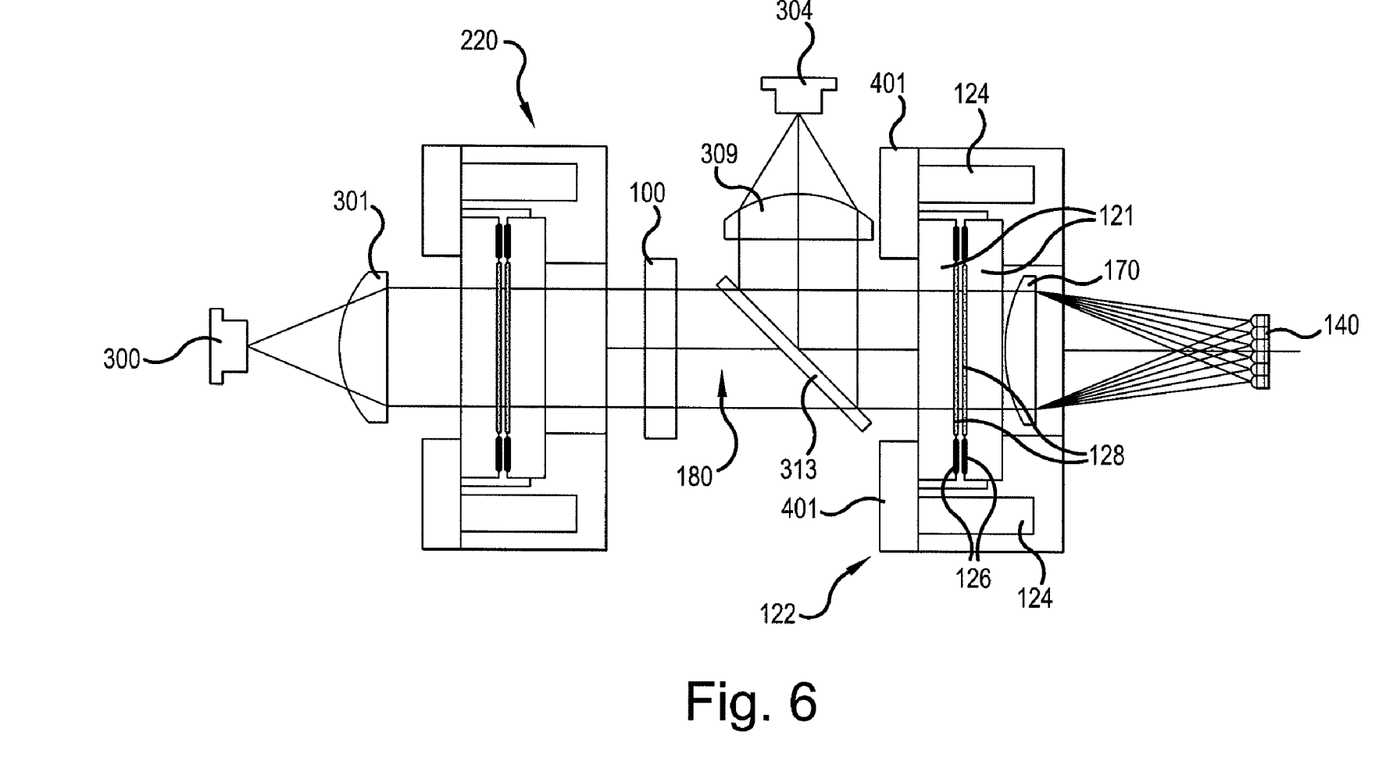
FIG. 6 shows as a block diagram a fourth modification of a spectrometer in accordance with the invention.

FIG. 6 depicts a solution, where in the application of FIG. 4 the piezo elements 124 are implemented as in FIG. 5. The control elements are not described in this connection.

Figure 7:
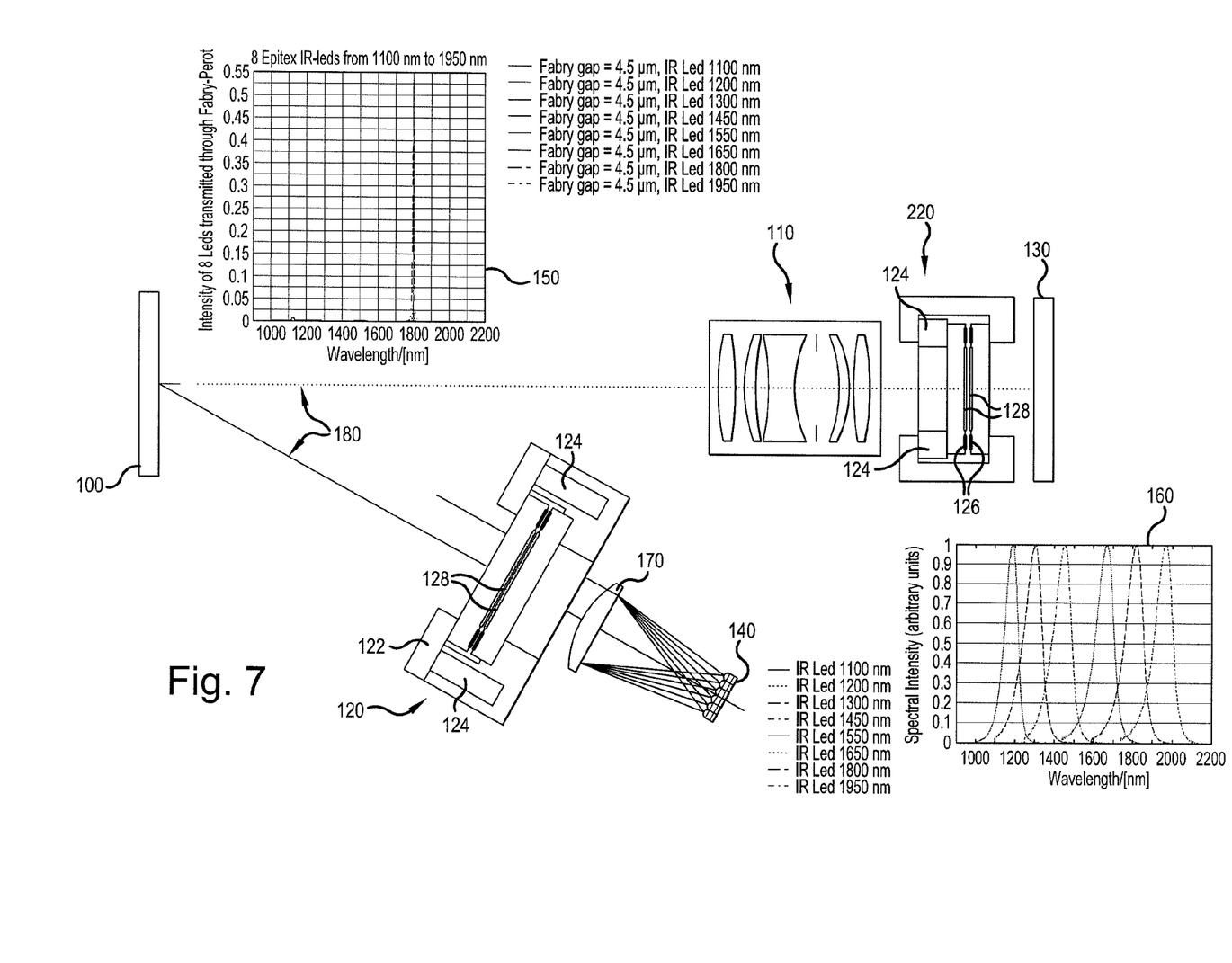
FIG. 7 shows as a block diagram a fifth modification of a spectrometer in accordance with the invention.

FIG. 7 depicts an embodiment of the invention, where the optical path 180 is slanted. Also in this solution two Fabry-Perot interferometers 120 and 220 are used with an optical element 110. The detection is performed by a RGB color image sensor 130 (detector), (CMOS or CCD).

The solution of FIG. 7 represents a single point spectrometer, which offers cost effective way to construct an IR spectrometer. In many applications there exists a need for spectral imaging of the target. This can be accomplished by a concept shown in FIG. 7. The target 100 is illuminated with a multiple LED light source 140 similar to the module explained in previous embodiments. By exposing the target 100 with a short light pulse for one LED at a time and tuning the FPIs 120 of the LED module and the other 220 in front of the linear or array detector 130 to the needed wavelength spectral image of the target can be constructed. When using a linear array in which the signal from each detector can be read out in parallel the similar signal processing as depicted in previous chapter for a single point spectrometer can be used.

Figure 8:
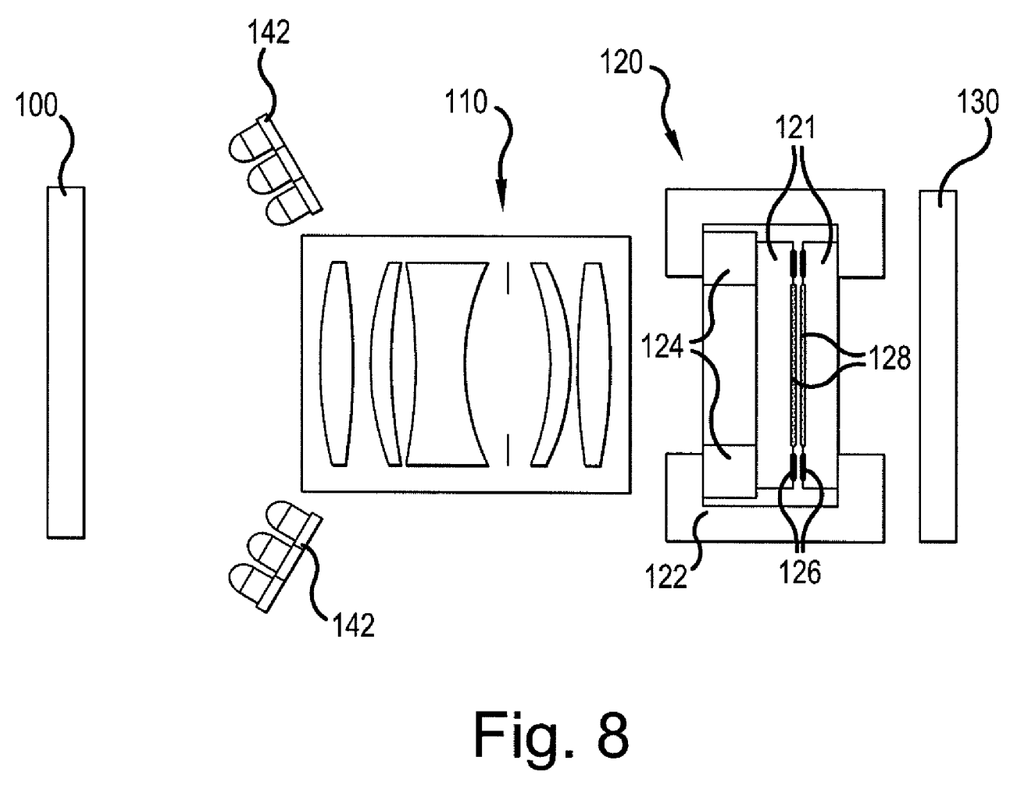
FIG. 8 shows as a block diagram a sixth modification of a spectrometer in accordance with the invention.

In accordance with FIG. 8 the measurement target 100 is illuminated directly by light sources 142. The Fabry-Perot interferometer is used in connection with the detection only and as a detector is used a RGB color image sensor 130.

The assessment and simulations performed proved that it is possible to control the spectrum of a multi Led illuminator via Fabry-Perot interferometer whose gap width can be tuned in the range 1-5 μm. The mirror coating can be made with Ag, which is rather standard coating material. The metal coating is preferred because the multilayer dielectric mirrors only have high reflectance at a rather limited spectral range.

A suitable wavelength area for the LEDs in accordance with the invention is e.g., in the range of 200-5000 nm.

The invention claimed is:

1. A spectrometer for material analysis comprising:
 a radiant source formed by multiple single radiation sources having different central wavelengths, for generating a measuring signal,
 a measurement object containing a material to be analyzed,
 at least one electrically tunable Fabry-Perot filter for band pass filtering the measuring signal by at least two pass bands for the used signal wavelength range, and
 a detector for detecting said filtered measuring signals received from the measurement object,
wherein
 the spectrometer has means for modulating each of the single radiation sources and correspondingly means for demodulating the detected signals such that the signal from each single radiation source can be distinguished from each other in the detector, and
 the spectrometer has means for detecting and demodulating multiple pass bands simultaneously.

2. The spectrometer in accordance with claim 1, wherein the means for modulating and demodulating are based on frequency modulation.

3. The spectrometer in accordance with claim 1, wherein the means for modulating and demodulating are based on time division modulation.

4. The spectrometer in accordance with claim 1, wherein the means for modulating and demodulating are based on phase modulation.

5. The spectrometer in accordance with claim 1, wherein the spectrometer includes a second Fabry-Perot interferometer in vicinity of the detector.

6. The spectrometer in accordance with claim 1, wherein the multiple single radiation sources are LEDs.

7. A control method for a spectrometer for material analysis, which method comprises the following steps:
 generating a measurement signal by a radiant source formed by multiple single radiation sources having different central wavelengths,
 directing the measurement signal to a measurement object containing a material to be analyzed,
 filtering the measurement signal by at least one electrically tunable Fabry-Perot filter by at least two pass bands for the used signal wavelength range, and
 detecting said filtered measuring signals received from the measurement object,
wherein the method further comprises
 modulating each of the single radiation sources and correspondingly
 demodulating the detected signals such that the signal from each single radiation source can be distinguished from each other in the detector and
 detecting and demodulating multiple pass bands simultaneously.

8. The method in accordance with claim 7, wherein the modulation and demodulation are performed by frequency modulation.

9. The method in accordance with claim 7, wherein the modulation and demodulation are performed by time division modulation.

10. The method in accordance with claim 7, wherein the modulation and demodulation are performed by phase modulation.

11. The method in accordance with claim 7, wherein a second Fabry-Perot interferometer is used in vicinity of the detector.

12. The method in accordance with claim 7, wherein the signal is formed by the multiple single LED radiation sources.

13. The spectrometer in accordance with claim 1, wherein a second Fabry-Perot interferometer is used in vicinity of the detector.

14. The spectrometer in accordance with claim 1, wherein the signal is formed by the multiple single LED radiation sources.

* * * * *